United States Patent
Lupsa et al.

(10) Patent No.: US 12,444,914 B2
(45) Date of Patent: Oct. 14, 2025

(54) SPLICE PLATE ASSEMBLY FOR CABLE TRAY

(71) Applicant: T&B CABLE TRAY CANADA LTD, Saint-Laurent (CA)

(72) Inventors: Ioan Liviu Lupsa, Dollard-des-Ormeaux (CA); Daniel Cardin, Ste-Julie (CA); Serge Levesque, Saint-Jean-sur-Richelieu (CA)

(73) Assignee: T&B CABLE TRAY CANADA LTD., Saint-Laurent (CA)

(*) Notice: Subject to any disclaimer, the term of this patent is extended or adjusted under 35 U.S.C. 154(b) by 88 days.

(21) Appl. No.: 15/999,740

(22) PCT Filed: Feb. 23, 2017

(86) PCT No.: PCT/US2017/019066
§ 371 (c)(1),
(2) Date: May 13, 2021

(87) PCT Pub. No.: WO2017/147256
PCT Pub. Date: Aug. 31, 2017

(65) Prior Publication Data
US 2024/0364084 A1    Oct. 31, 2024

Related U.S. Application Data

(60) Provisional application No. 62/299,782, filed on Feb. 25, 2016.

(51) Int. Cl.
*H02G 3/06* (2006.01)
(52) U.S. Cl.
CPC ................. *H02G 3/0608* (2013.01)

(58) Field of Classification Search
None
See application file for complete search history.

(56) References Cited

U.S. PATENT DOCUMENTS 1,727,772 A    9/1929  Hotchkin
2,656,999 A *  10/1953  Ullberg, Jr. .............. H04Q 1/06
                                                      248/68.1

(Continued)

FOREIGN PATENT DOCUMENTS

EP    0 578 459 A1    1/1994
EP      0930685 A1    7/1999

(Continued)

OTHER PUBLICATIONS

International Search Report and Written Opinion issued in International Patent Application No. PCT/US2017/019066, mailing date May 17, 2017.

*Primary Examiner* — Krystal Robinson
(74) *Attorney, Agent, or Firm* — Benesch Friedlander Coplan & Aronoff LLP (57) ABSTRACT

A splice plate assembly for connecting at least two cable trays to effect an angle transition includes a splice plate configured to connect inner side rails of the cable trays to form an inside corner, a bendable strap configured to connect outer side rails of the cable trays to form an outside corner, and a rung adapted to be connected between the splice plate and the bendable strap. A method of installing a splice plate assembly includes preparing cable trays having a same length, connecting inner side rails of the cable trays via a splice plate to form an inside corner, connecting outer side rails of the cable trays via a bendable strap to form an outside corner, and securing a rung between the splice plate and bendable strap.

19 Claims, 7 Drawing Sheets

(56) References Cited

U.S. PATENT DOCUMENTS

| | | | |
|---|---|---|---|
| 2,823,056 A * | 2/1958 | Unico | F16L 3/26 403/376 |
| 2,860,742 A | 11/1958 | Waters, Sr. et al. | |
| 3,053,358 A | 9/1962 | Gross | |
| 3,351,699 A | 11/1967 | Merckle | |
| 3,618,882 A | 11/1971 | Podedworny | |
| 4,232,845 A | 11/1980 | Turner | |
| 4,661,007 A | 4/1987 | Schneider | |
| 5,271,585 A * | 12/1993 | Zetena, Jr. | H02G 3/263 174/95 |
| 5,470,021 A | 11/1995 | Looney | |
| 6,068,220 A | 5/2000 | Alrey | |
| 6,313,405 B1 * | 11/2001 | Rinderer | H02G 3/0456 174/99 R |
| 6,460,812 B1 | 10/2002 | Jette | |
| 6,478,499 B1 | 11/2002 | Fugman et al. | |
| 6,498,296 B2 | 12/2002 | Benito-Navazo | |
| 6,574,192 B1 | 6/2003 | Egnell | |
| 6,585,195 B2 | 7/2003 | Wentworth et al. | |
| 6,637,704 B2 | 10/2003 | Jette | |
| 6,874,969 B2 | 4/2005 | Jadaud et al. | |
| 6,926,236 B2 | 8/2005 | Jette | |
| 6,959,898 B1 | 11/2005 | Laughlin et al. | |
| 7,029,195 B2 | 4/2006 | Nault et al. | |
| 7,614,817 B2 | 11/2009 | Nault et al. | |
| 7,742,675 B2 | 6/2010 | Sayres et al. | |
| 7,954,776 B2 | 6/2011 | Davis et al. | |
| 8,006,454 B2 | 8/2011 | Jankovec et al. | |
| 8,254,744 B2 | 8/2012 | Sayres et al. | |
| 8,459,604 B2 | 6/2013 | Smith et al. | |
| 8,573,409 B2 | 11/2013 | White | |
| 8,733,723 B2 | 5/2014 | Smith et al. | |
| 8,757,559 B2 | 6/2014 | Davis et al. | |
| 9,104,004 B2 | 8/2015 | Ferris et al. | |
| 9,184,578 B2 | 11/2015 | Winn et al. | |
| 2011/0013978 A1 * | 1/2011 | Smith | H02G 3/0608 403/306 |
| 2012/0312761 A1 * | 12/2012 | White | H02G 3/0608 403/205 |
| 2014/0346289 A1 * | 11/2014 | Cardin | H02G 3/0608 248/68.1 |
| 2015/0001352 A1 * | 1/2015 | Kellerman | H02G 3/0608 248/68.1 |
| 2015/0200526 A1 | 7/2015 | Bayazit et al. | |
| 2016/0077299 A1 * | 3/2016 | Tally | G02B 6/4459 385/135 |

FOREIGN PATENT DOCUMENTS

| | | |
|---|---|---|
| EP | 2846428 A1 | 3/2015 |
| EP | 2884609 A1 | 6/2015 |

* cited by examiner

SPLICE PLATE ASSEMBLY FOR CABLE TRAY

CROSS REFERENCE TO RELATED APPLICATIONS

This application is the National Stage of International Application No. PCT/US2017/019066, which designates the U.S., filed on Feb. 23, 2017, which claims the benefit of U.S. Provisional Patent Application No. 62/299,782, filed on Feb. 25, 2016, the contents of all of which are incorporated herein by reference in its entirety.

FIELD OF THE INVENTION

The present invention relates to splice plate assemblies, and more particularly, to bendable splice plate assemblies for effecting angle transitions in cable trays.

BACKGROUND OF THE INVENTION

A cable tray system supports electric cables used for power distribution and communication in the wiring of various facilities or commercial buildings. Generally, a cable tray includes a pair of parallel side rails and a plurality of transverse rungs secured between the parallel side rails to fix the spacing between them. In order to effect turned angle facilities, a flexible splice plate is often used to effect an angle transition of the cable trays. Typically, two flexible splice plates are applied to the cable trays, one on the outside corner and one on the inside corner. Splice plates for cable trays currently available in the market require detailed miter cutting of the side rails to effect angle transitions.

The current splice plate design and configuration have several disadvantages. First, the cable which is supported by the cable tray can be damaged when pulled because it may come in contact with the sharp edges of the side rails of the cable trays. To avoid cable damages, installers need to perform additional time consuming task to push the cable away from the sharp edge by installing rollers or by pushing them manually while pulling the cable. Second, as stated above, the side rails need to be cut on the worksite to different lengths using different miter cuts, depending on the desired angle between the cable trays. This is time consuming and expensive. Lastly, the rung also must be cut depending on the angle transition to connect between the inside and outside bendable splice plates.

Accordingly, although various splice plate assemblies are available currently in the market, further improvements are possible.

SUMMARY OF THE INVENTION

According to an embodiment of the present invention, a splice plate assembly for connecting at least two cable trays to effect an angle transition includes a splice plate configured to connect inner side rails of the cable trays to form an inside corner, a bendable strap configured to connect outer side rails of the cable trays to form an outside corner, and a rung adapted to be connected between the splice plate and the bendable strap.

According to a method aspect, a method of installing a splice plate assembly includes preparing cable trays having a same length, connecting inner side rails of the cable trays via a splice plate to form an inside corner, connecting outer side rails of the cable trays via a bendable strap to form an outside corner, and securing a rung between the splice plate and bendable strap.

These and other aspects of the present invention will be better understood in view of the drawings and following detailed description.

DETAILED DESCRIPTION OF PREFERRED EMBODIMENTS

Figure 1:
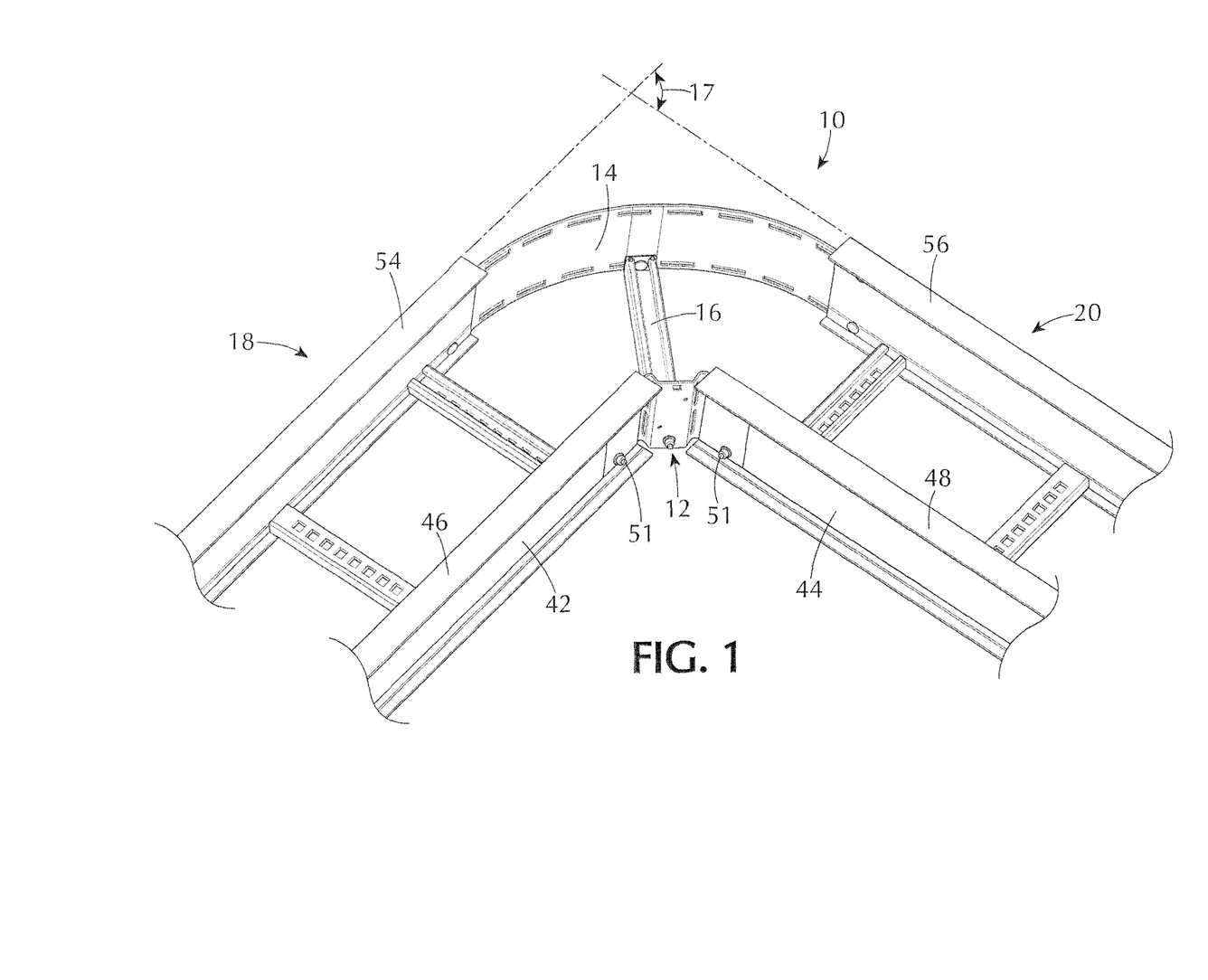
FIG. 1 is a perspective view of the splice plate assembly, according to an embodiment of the present invention, applied at a right angle between cable trays.
Figure 2:
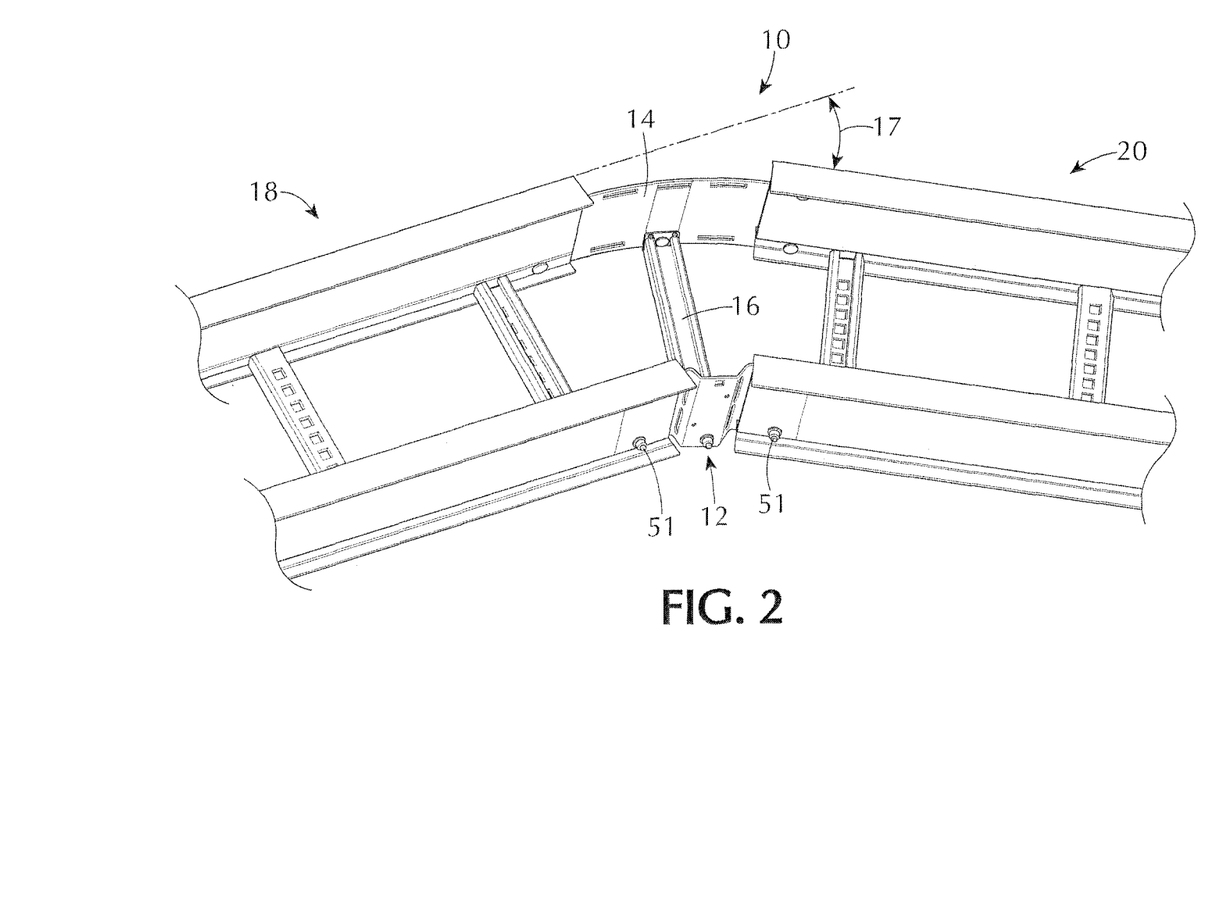
FIG. 2 is a perspective view of the splice plate assembly in FIG. 1, applied at an acute angle between the cable trays.

According to an embodiment of the present invention, referring to FIGS. 1 and 2, a splice plate assembly 10 includes a splice plate 12, a bendable strap 14 and a rung 16 adapted to connect between the splice plate 12 and the bendable strap 14. To effect an angle transition 17 of two adjacent cable trays 18, 20, the splice plate 12 and bendable strap 14 are designed and configured to bend, as will be described in greater detail below.

Figure 3:
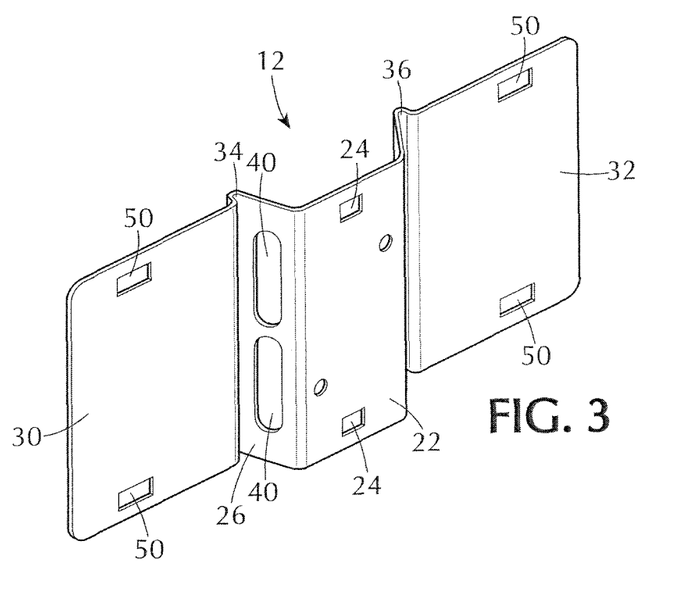
FIG. 3 is a perspective front view of the splice plate in FIG. 1.
Figure 4:
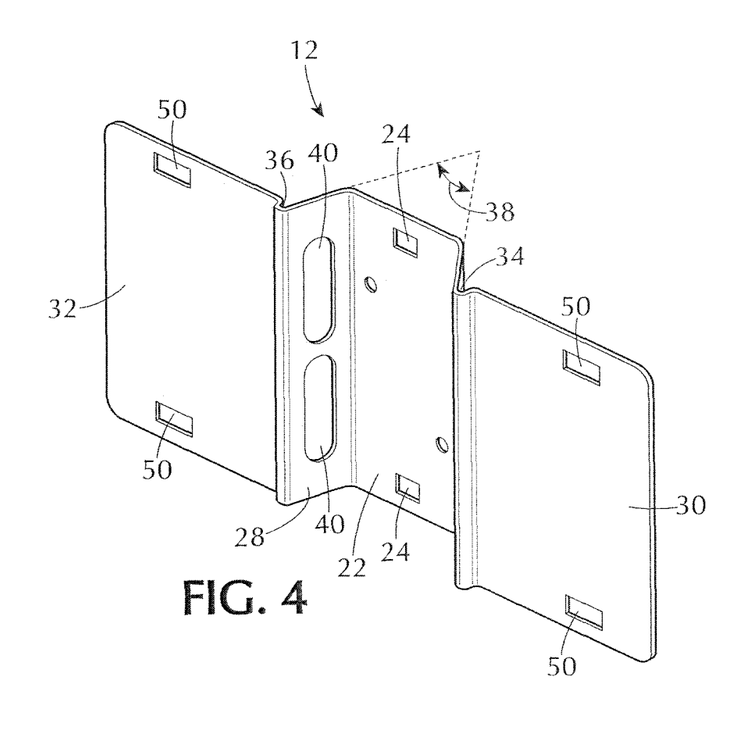
FIG. 4 is a perspective rear view of the splice plate in FIG. 1.

Referring to FIGS. 3 and 4, the splice plate 12 includes an intermediate member 22 having a plurality of intermediate member holes 24, first and second bendable members 26, 28, and first and second mounting members 30, 32 which are connected to the first bendable members 26 via a first rib 34 and to the second bendable member 28 via a second rib 36, respectively. The first and second ribs 34, 36 facilitate a bending mechanism of the splice plate 12 to effect the angle transition 17 of the cable trays 18, 20. In addition, protrusions of the first and second ribs 34, 36 provide a transition surface for the cable trays 18, 20 and prevent cables from touching sharp edges of side rails during the cable pulling.

The first and second bendable members 26, 28 are connected by the intermediate member 22 at a joint angle 38. The joint angle 38 is an acute angle that is suitable to provide the maximum bending mechanism of the splice plate 12. Each of the first and second bendable members 26, 28 defines a plurality of bendable member openings 40 that are elongated to facilitate easy bending of the splice plate 12 during installation of the splice plate assembly 10.

The first and second mounting members 30, 32 are closely dimensioned to be placed and fitted within outer side rail grooves 42, 44 of inner side rails 46, 48 of the cable trays 18, 20, as shown in FIGS. 1 and 2. Each of the first and second mounting members 30, 32 defines a plurality of mounting member holes 50 in top and bottom portions of the mounting members 30, 32, which are closely dimensioned to align with inner side rail holes (not shown). A non-rotative carriage bolt 51 or other suitable connector can be inserted through the aligned holes to affix the splice plate 12 to the inner side rails 46, 48 of the cable trays 18, 20.

In the depicted embodiment, the first and second bendable members 26, 28, the first and second mounting members 30, 32, and the intermediate member 22 are substantially flat and rectangular in form, having equal heights. The first and second mounting members 30, 32 are substantially identical. In addition, the first and second bendable members 26, 28 are substantially identical.

Figure 5:
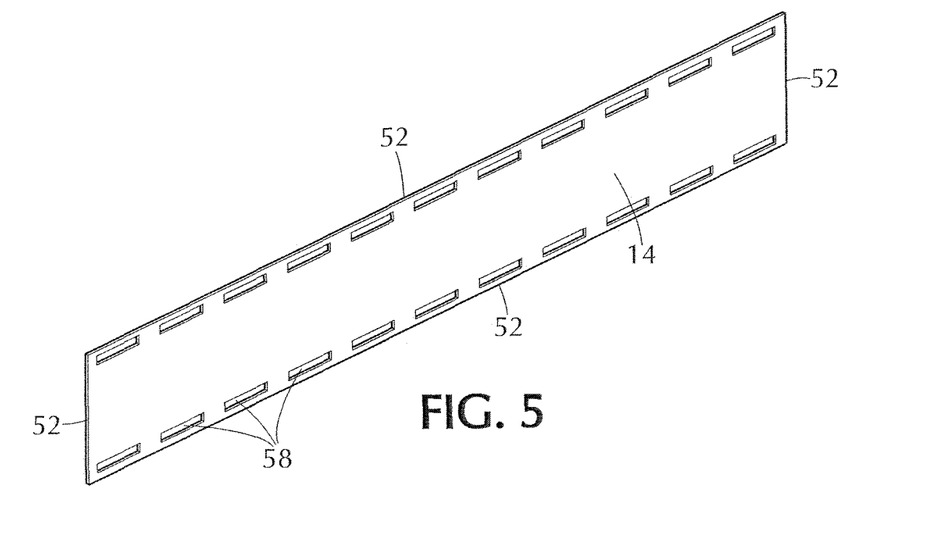
FIG. 5 is a perspective view of the bendable strap in FIG. 1.

Referring to FIG. 5, the bendable strap 14 is a rectangular flexible substrate, which includes edges 52 surrounding flat opposite surfaces. The bendable strap 14 is closely dimensioned to be placed and seated within outer side rail grooves (not shown) of outer side rails 54, 56 of the cable trays 18, 20, as illustrated in FIGS. 1 and 2. A plurality of bendable strap holes 58 are defined across top and bottom portions of the bendable strap 14, which can align with outer side rail holes (not shown) at various angles to secure the bendable strap 14 to the cable trays 18, 20. The carriage bolt or other connector can be inserted through the aligned holes to affix the bendable strap 14 to the outer side rails 54, 56 of the cable trays 18, 20. The bendable strap 14 is a universal strap which can accommodate various angle transitions of the cable trays 18, 20. For example, the transition angle 17 between the cable trays 18, 20 may be easily adjusted by varying a bending degree of the bendable strap 14 and the splice plate 12. This eliminates a need to cut the cable trays 18, 20 and the rung 16 in different lengths to accomplish a desired angle transition.

Figure 6:
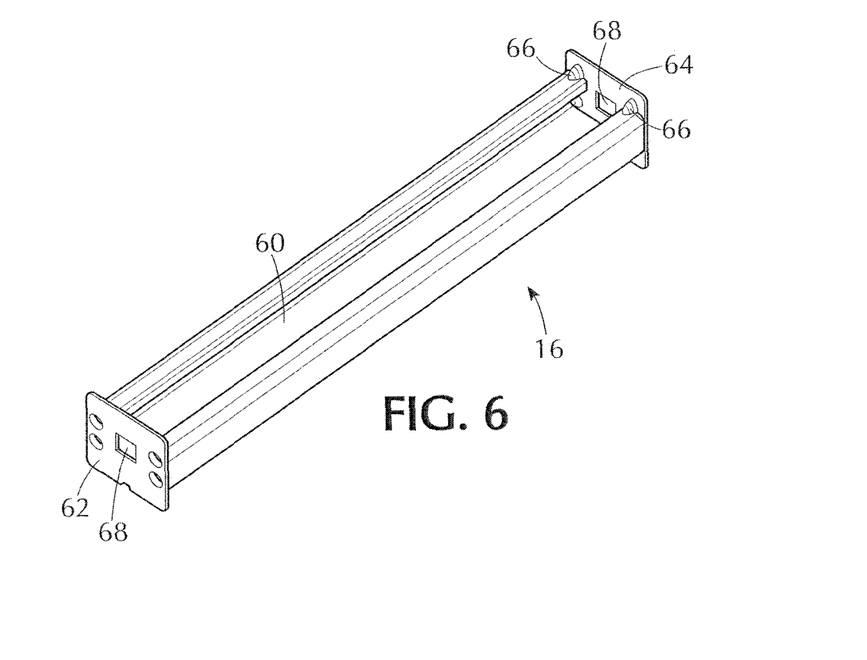
FIG. 6 is a perspective view of the rung in FIG. 1.
Figure 7:
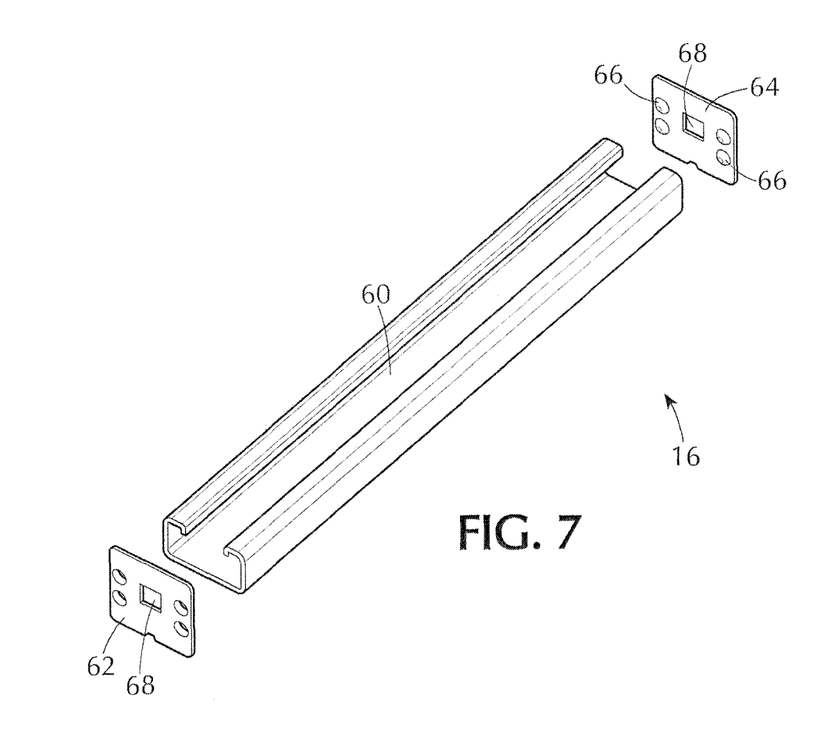
FIG. 7 is a partially-exploded perspective view of the rung in FIG. 6.
Figure 8:
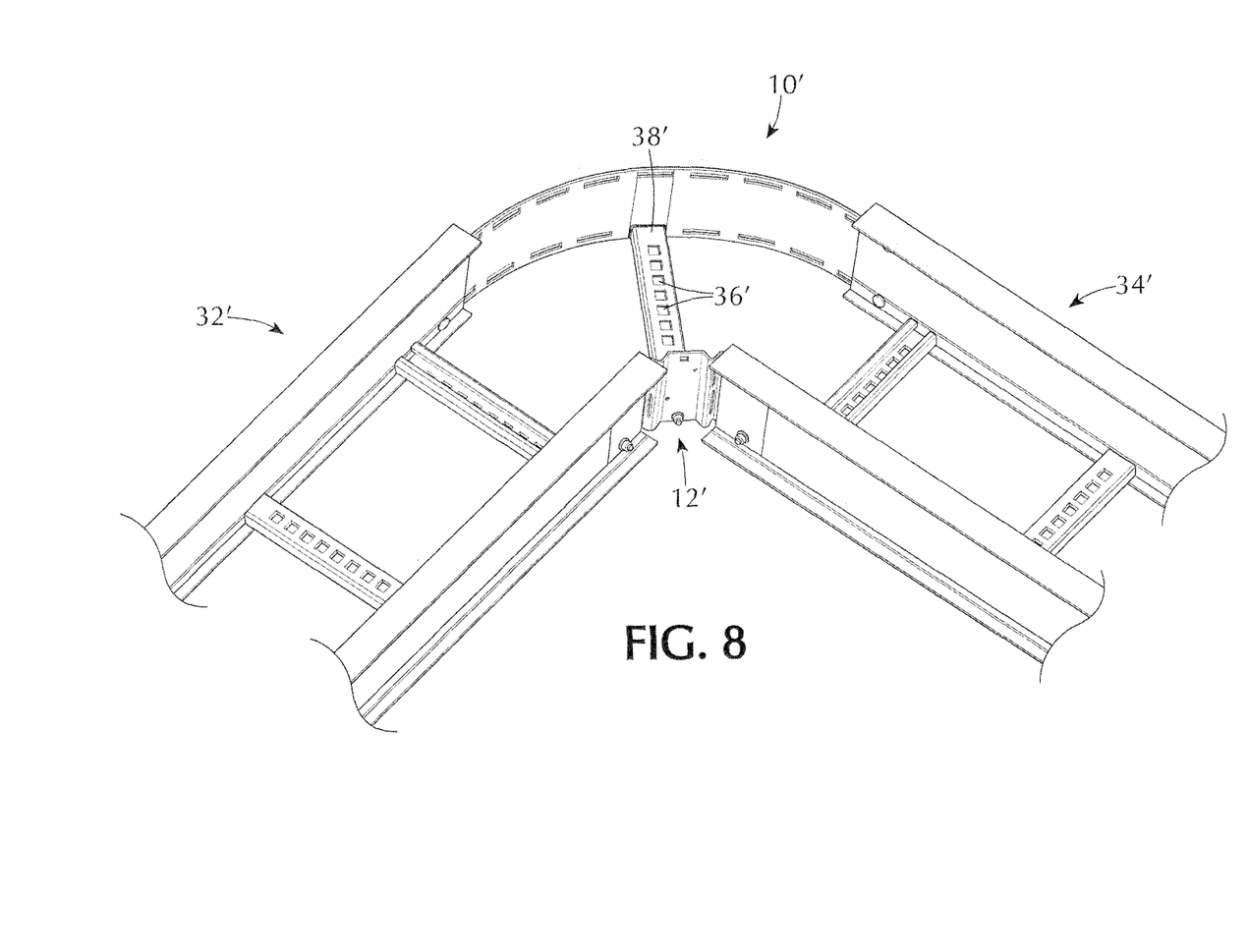
FIG. 8 is a perspective view of the splice plate assembly, according to another embodiment of the present invention, applied at a right angle between cable trays.

Referring to FIGS. 6-8, the rung 16 includes an elongated channel 60 and first and second end plates 62, 64 adapted to be affixed to each end of the channel 60. In the depicted embodiment, each of the first and second end plates 62, 64 is welded to the channel 60; alternately, the first and second end plates 62, 64 could be formed integrally therewith or attached via some other means. As shown in FIG. 7, each of the first and second end plates 62, 64 includes a plurality of embossments 66 such that they can fit into the channel 60 and hold it while the welding is performed.

Each of the first and second end plates 62, 64 defines a rung mounting hole 68, which can be aligned with one of the plurality of intermediate member holes 24 at one end of the rung 16 or aligned with one of the plurality of bendable strap holes 58 at the opposite end of the rung 16. The carriage bolt or other suitable connector can be inserted through the aligned holes to secure the rung 16 to both the splice plate 12 and bendable strap 14.

In the depicted embodiment, the splice plate 12, bendable strap 14 and rung 16 are made of one or more materials having suitable properties for a desired application, including strength, weight, rigidity, etc. Aluminum is generally preferred. Other material and finishes suitable for the splice plate 12 and rung 16 are hot dip galvanized steel, pregalvanized steel, and stainless steel. The splice plate 12 is formed as unitary pieces; for example, by stamping from a single sheet of metal. The rung 16 is made by roll forming.

Figure 9:
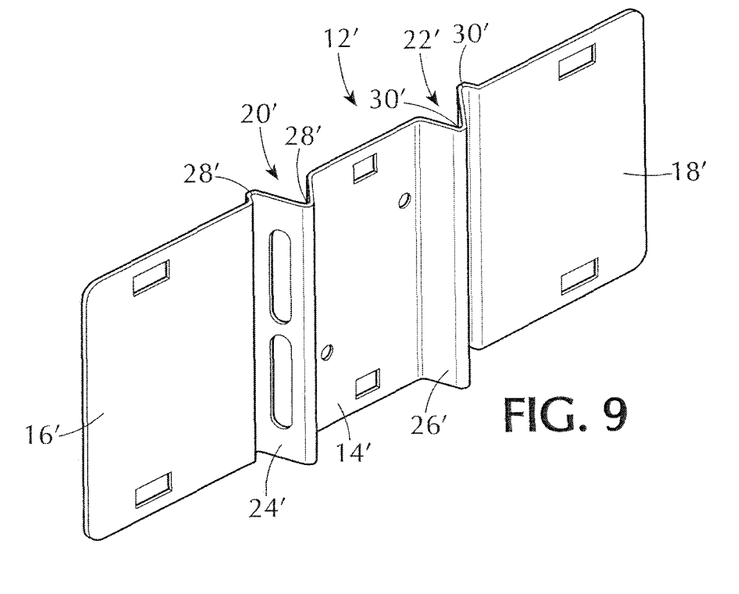
FIG. 9 is a perspective front view of the splice plate in FIG. 8.
Figure 10:
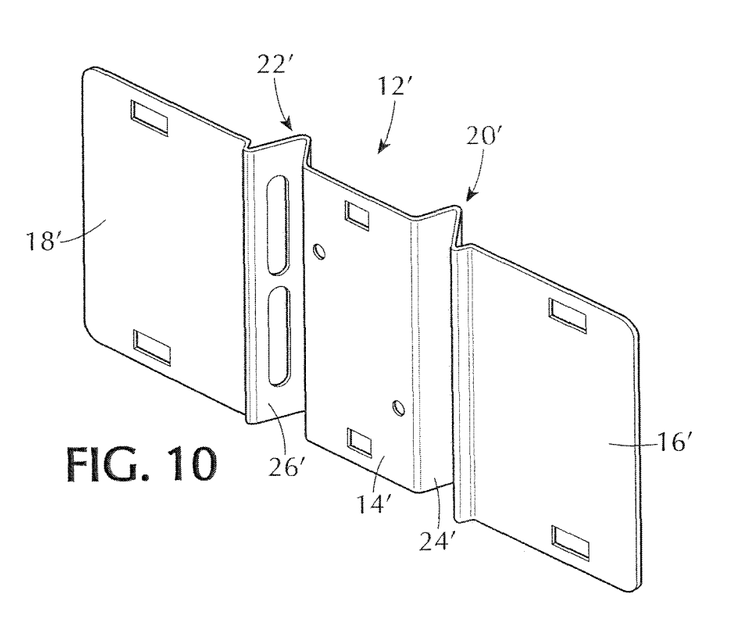
FIG. 10 is a perspective rear view of the splice plate in FIG. 8.

Referring to FIGS. 8-10, it will be appreciated that other designs and configurations could be used for the splice plate assembly 10', as deemed suitable for a given application factors such as cable tray dimensions. For example, in an alternate embodiment, the splice plate 12' includes an intermediate member 14', first and second mounting members 16', 18', a first bendable portion 20' connected between the first mounting member 16' and the intermediate member 14', and a second bendable portion 22' connected between the second mounting member 18' and the intermediate member 14'. The first and second bendable portions 20', 22' have a plurality of first bendable members 24' and a plurality of second bendable members 26', respectively. A plurality of first and second ribs 28', 30' connect each of the plurality of first bendable members 24' and each of the plurality of second bendable members 26', respectively, such that the plurality of first and second ribs 28', 30' provide a bending mechanism (capable of higher dilatation and contraction) of the splice plate 12' to effect an angle transition of the cable trays 32', 34'. In addition, a plurality of channel holes 36' could be defined on a channel 38' to allow cable attachment therethrough, as illustrated in FIG. 8.

Referring again to FIGS. 1 and 2, a method for installing the splice plate assembly 10 to effect the angle transition 17 of the cable trays 18, 20 will be described. First, the cable trays 18, 20 are cut and prepared with a same length. Each of the first and second mounting members 30, 32 of the splice plate 12 is then placed and seated within the outer side rail grooves 42, 44 of the inner side rails 46, 48 of the cable trays 18, 20. The splice plate 12 is affixed to the cable trays 18, 20 by securing the mounting members 30, 32 to the inner side rails 46, 48 of the cable trays 18, 20 with a connector such as carriage bold/nut 51, thereby forming an inside corner.

Similarly, each end portion of the bendable trap 14 is placed and seated within the outer side rail grooves (not shown) of the outer side rails 54, 56 of the cable trays 18, 20. Again, the bendable strap 14 is affixed to the cable trays 18, 20 by securing each end portion of the bendable strap 14 to the outer side rails 54, 56 of the cable trays 18, 20 with a connector such as carriage bold/nut, thereby forming an outside corner. The transition angle 17 between the cable trays 18, 20 may be easily adjusted by varying a bending degree of the bendable strap 14 and splice plate 12. With both the splice plate 12 and bendable strap 14 applied to the cable trays 18, 20, the rung 16 is then placed and secured between the splice plate 12 and bendable strap 14 to fix the spacing between them.

From the foregoing, it will be appreciated that a splice plate assembly according to the present invention improves an angle transition between cable trays, while preventing cable damages and time consuming installation of the splice plate assembly.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. A splice plate assembly for connecting at least two cable trays to effect an angle transition comprising:
   a splice plate configured to connect inner side rails of the at least two cable trays to form an inside corner, the splice plate including:
      an intermediate member;
      first and second bendable members connected by the intermediate member at a joint angle; and
      first and second mounting members connected to the first and second bendable members via first and second ribs, respectively;

a bendable strap configured to connect outer side rails of the at least two cable trays to form an outside corner; and a rung adapted to be connected between the splice plate and the bendable strap.

2. The splice plate assembly of claim 1, wherein the first and second ribs provide a bending mechanism of the splice plate.

3. The splice plate assembly of claim 1, wherein each of the first and second bendable members defines a plurality of bendable member openings to facilitate easy bending of the splice plate.

4. The splice plate assembly of claim 1, wherein each of the first and second mounting members defines a plurality of mounting member holes through which connectors could be inserted to affix the splice plate to the inner side rails of the at least two cable trays.

5. The splice plate assembly of claim 1, wherein the intermediate member defines a plurality of intermediate member holes through which connectors could be inserted to secure the rung to the splice plate.

6. The splice plate assembly of claim 1, wherein the first and second bendable members, the first and second mounting members, and the intermediate member have equal heights.

7. The splice plate assembly of claim 1, wherein the first and second bendable members, the first and second mounting members, and the intermediate member are substantially rectangular in form.

8. The splice plate assembly of claim 1, wherein the bendable strap defines a plurality of bendable strap holes through which connectors could be inserted to affix the bendable strap to the outer side rails of the at least two cable trays.

9. The splice plate assembly of claim 1, wherein the bendable strap is a flexible substrate.

10. The splice plate assembly of claim 1, wherein the bendable strap is substantially rectangular in form.

11. The splice plate assembly of claim 1, wherein the rung includes:
 first and second end plates; and
 an elongated channel configured to be connected between the first and second end plates.

12. The splice plate assembly of claim 11, wherein each end of the channel is connected to the first and second end plates by welding.

13. The splice plate assembly of claim 12, wherein each of the first and second end plates includes a plurality of embossments such that they can fit into the channel and hold it while the welding is performed.

14. The splice plate assembly of claim 11, wherein:
 the intermediate member defines a plurality of intermediate member holes through which connectors are insertable to secure the rung to the splice plate;
 the bendable strap defines a plurality of bendable strap holes through which connectors are insertable to affix the bendable strap to the outer side rails of the at least two cable trays; and each of the first and second end plates defines an end plate hole that can be aligned with one of the plurality of intermediate member holes or one of the plurality of bendable strap holes to connect the rung to the splice plate and the bendable strap.

15. The splice plate assembly of claim 11, wherein a plurality of channel holes are defined on the channel to allow cable attachment therethrough.

16. The splice plate assembly of claim 1, wherein the splice plate, the bendable strap, and the rung are made out of aluminum.

17. A splice plate assembly for connecting at least two cable trays to effect an angle transition comprising:
 a splice plate configured to connect inner side rails of the at least two cable trays to form an inside corner, the splice plate including:
  an intermediate member;
  first and second mounting members;
  a first bendable portion having a plurality of first bendable members, the first bendable portion connected between the first mounting member and the intermediate member; and
  a second bendable portion having a plurality of second bendable members, the second bendable portion connected between the second mounting member and the intermediate member;
 a bendable strap configured to connect outer side rails of the at least two cable trays to form an outside corner; and
 a rung adapted to be connected between the splice plate and the bendable strap.

18. The splice plate assembly of claim 17, wherein a plurality of first and second ribs connect each of the plurality of first bendable members and the plurality of second bendable members, respectively, such that the plurality of first and second ribs provide a bending mechanism of the splice plate.

19. A method of installing a splice plate assembly, the method comprising:
 preparing cable trays having a same length;
 affixing a splice plate to the cable trays, the splice plate including:
  an intermediate member;
  first and second bendable members connected by the intermediate member at a joint angle; and
  first and second mounting members connected to the first and second bendable members via first and second ribs, respectively;
 connecting inner side rails of the cable trays via the first and second mounting members of the splice plate to form an inside corner;
 connecting outer side rails of the cable trays via a bendable strap to form an outside corner; and
 securing a rung between the splice plate and the bendable strap.

* * * * *